United States Patent
Stauffer et al.

(10) Patent No.: US 8,284,693 B2
(45) Date of Patent: Oct. 9, 2012

(54) MULTI-STREAM PRIORITY-BASED SPACE-TIME CODING

(75) Inventors: Erik Stauffer, Santa Clara, CA (US);
Bertrand Hochwald, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 329 days.

(21) Appl. No.: 12/696,636

(22) Filed: Jan. 29, 2010

(65) Prior Publication Data

US 2010/0195526 A1 Aug. 5, 2010

Related U.S. Application Data (60) Provisional application No. 61/206,765, filed on Feb. 3, 2009.

(51) Int. Cl.
*H04L 12/26* (2006.01)
(52) U.S. Cl. ........................................ 370/252; 375/299
(58) Field of Classification Search .................. 370/252, 370/253, 320, 342–344, 334; 375/299
See application file for complete search history.

(56) References Cited

U.S. PATENT DOCUMENTS

| | | | |
|---|---|---|---|
| 2004/0052315 A1* | 3/2004 | Thielecke et al. | 375/299 |
| 2007/0183414 A1* | 8/2007 | Hoshino et al. | 370/369 |
| 2009/0034639 A1* | 2/2009 | Hwang et al. | 375/260 |
| 2009/0296842 A1* | 12/2009 | Papadopoulos et al. | 375/260 |

* cited by examiner

*Primary Examiner* — Gary Mui
(74) *Attorney, Agent, or Firm* — Sterne, Kessler, Goldstein & Fox P.L.L.C.

(57) ABSTRACT

Embodiments for space-time coding are disclosed. One method includes establishing a priority for each of a plurality of data streams. A number of data bits for each of the plurality of data streams are allocated. A desired signal quality for each of the plurality of data streams is determined based on the corresponding priority. Each of the plurality of data streams are modulated according to the allocated number of data bits of each of the plurality of data streams. A space-time code is selected for each of the plurality of data streams based at least partially on the desired signal quality for each of the plurality of data streams, wherein at least one of the space-time codes is at least one of a vector or a matrix. Each of the modulated data streams are space-time coded with the selected space-time code. The space-time coded modulated data streams are summed, and transmitted.

23 Claims, 11 Drawing Sheets

MULTI-STREAM PRIORITY-BASED SPACE-TIME CODING

RELATED APPLICATIONS

This patent application claims priority to U.S. provisional patent application Ser. No. 61/206,765 filed on Feb. 3, 2009 which is incorporated by reference.

FIELD OF THE DESCRIBED EMBODIMENTS

The described embodiments relate generally to wireless communications. More particularly, the described embodiments relate to multiple data stream priority-based space-time coding.

BACKGROUND

A space-time code (STC) is a method employed to improve the reliability of data transmission in wireless communication systems using multiple transmit antennas. STCs rely on transmitting multiple, redundant copies of a data stream to the receiver in the hope that at least some of them may survive the physical path between transmission and reception in a good enough state to allow reliable decoding. STCs have made their way into wireless standards for point-to-point communications.

Standard codes for simultaneous reception include, for example, the single-antenna hierarchical codes in Digital Video Broadcast-Terestrial (DVB-T) and MediaFLO (forward link only). For the simplest such code, the symbol constellation is chosen on the basis of two streams, a "high-priority" stream and "low-priority" stream. The intent is that the high-priority stream can be decoded by a large set of terminals at low signal-to-interference-plus-noise-ratio (SINR), while a "lucky" subset of these terminals with sufficiently high SINR can also decode the low-priority stream.

The key to success of the DVB-T codes is their simplicity. The high-priority stream can be decoded max-log-optimally with only a small complexity penalty imposed by the presence of the low-priority stream. These codes are designed generally for single-transmit-antenna systems.

It is desirable to have a method of space-time coding multiple data streams for transmission from multiple antennas that allows higher-priority data streams to be decoded optimally without a large complexity penalty brought by the presence of the low-priority stream.

SUMMARY

An embodiment includes a method of space-time coding. The method includes establishing a priority for each of a plurality of data streams. A number of data bits for each of the plurality of data streams are allocated. A desired signal quality for each of the plurality of data streams is determined based on the corresponding priority. Each of the plurality of data streams are modulated according to the allocated number of data bits of each of the plurality of data streams. A space-time code is selected for each of the plurality of data streams based at least partially on the desired signal quality for each of the plurality of data streams, wherein at least one of the space-time codes is at least one of a vector or a matrix. Each of the modulated data streams are space-time coded with the selected space-time code. The space-time coded modulated data streams are summed, and transmitted.

Another embodiment includes another method of priority-based space-time coding. This method includes establishing a priority for each of a plurality of data streams. Each of the plurality of data steams is modulated according to an allocated number of data bits of each of the plurality of data streams. A desired signal quality for each of the plurality of data streams is determined based on the corresponding priority. A space-time code and weighting for each of the plurality of data streams is jointly selected based at least partially on the desired signal quality for each of the plurality of data streams, wherein at least one of the space-time codes is at least one of a vector or a matrix. Each of the modulated data streams is space-time coded by linearly combining the modulated data streams using the jointly selected space-time code and weighting. The space-time coded modulated data streams are transmitted.

Another embodiment includes a method of transmitting a plurality of space-time coded signals. This method includes modulating each of the plurality of data steams according to a priority of the data stream. Each of the modulated data streams are space-time coded with a corresponding constituent space-time code and weight, wherein the constituent space-time code and weight of each modulated data stream is based at least partially on the desired signal quality for each of the plurality of modulated data streams, and wherein at least one of the constituent space-time codes is at least one of a vector or a matrix. The space-time coded modulated data streams are summed. The summed space-time coded modulated data streams are transmitted.

Another embodiment includes a method of receiving a signal, wherein the signal was transmitted using priority-based space-time coding. This method includes receiving the signal. At least one of high-priority information or low-priority information is determined by demodulating the signal using knowledge of priority-based space-time coding and weighting of a plurality of transmitted constituent space-time code matrices, wherein a transmitted constituent space-time code is associated with each of a plurality of priority-based transmitted streams.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods and apparatuses of space-time coding of multiple priority-based data streams. Embodiments include encoding data such that high-priority data streams require a lower signal to noise and interference ratio (SINR) to decode than low-priority data streams. The simultaneous coding and modulation of multiple streams does not unduly burden demodulating and decoding of the streams individually.

Figure 1:
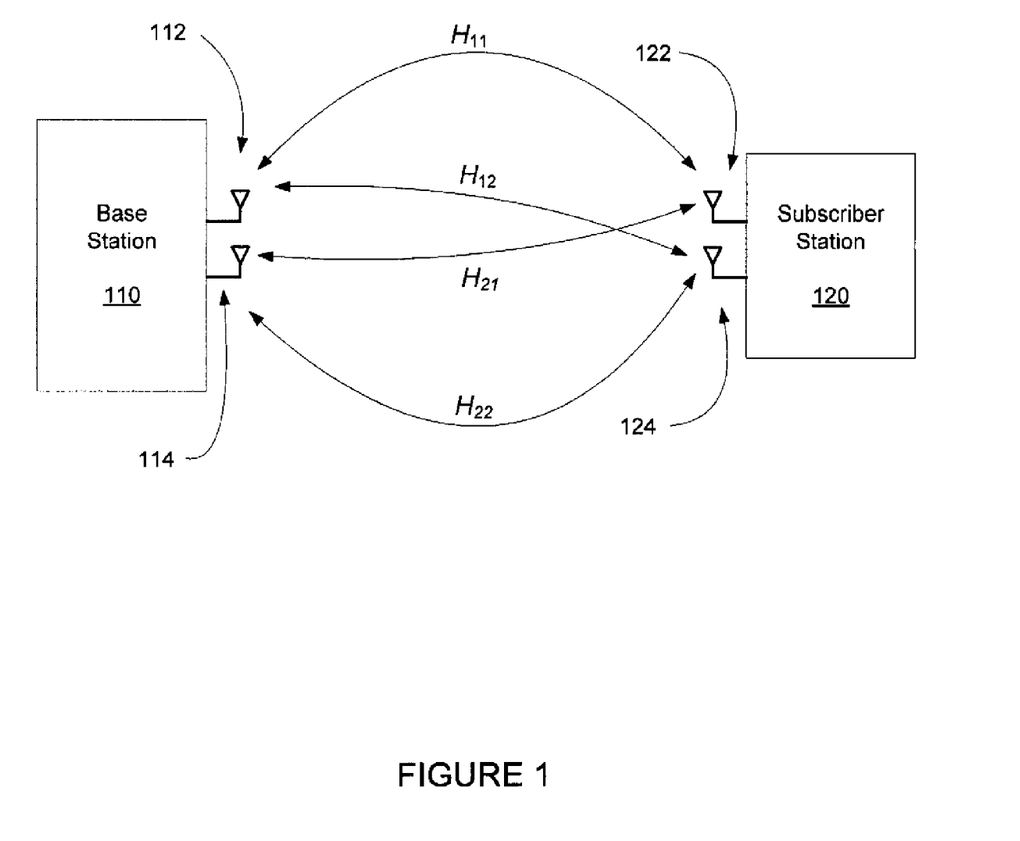
FIG. 1 shows an example of a base station and a subscriber station transceiver, wherein multiple propagation channels are formed between multiple antennas of a base station and multiple antennas of a subscriber station.

FIG. 1 shows an example of a base station 110 and a subscriber station transceiver 120, wherein multiple propagation channels $H_{11}$, $H_{12}$, $H_{21}$, $H_{22}$, are formed between each base station antenna 112, 114 and each subscriber station antenna 122, 124. It is to be understood, however, the base station 110 can include more than two antennas, and the subscriber transceiver 120 can include more than two antennas. Space-time codes (STC) can be used to improve the reliability of data transmission between the multiple antenna base station 110 and the subscriber station 120.

Figure 2:
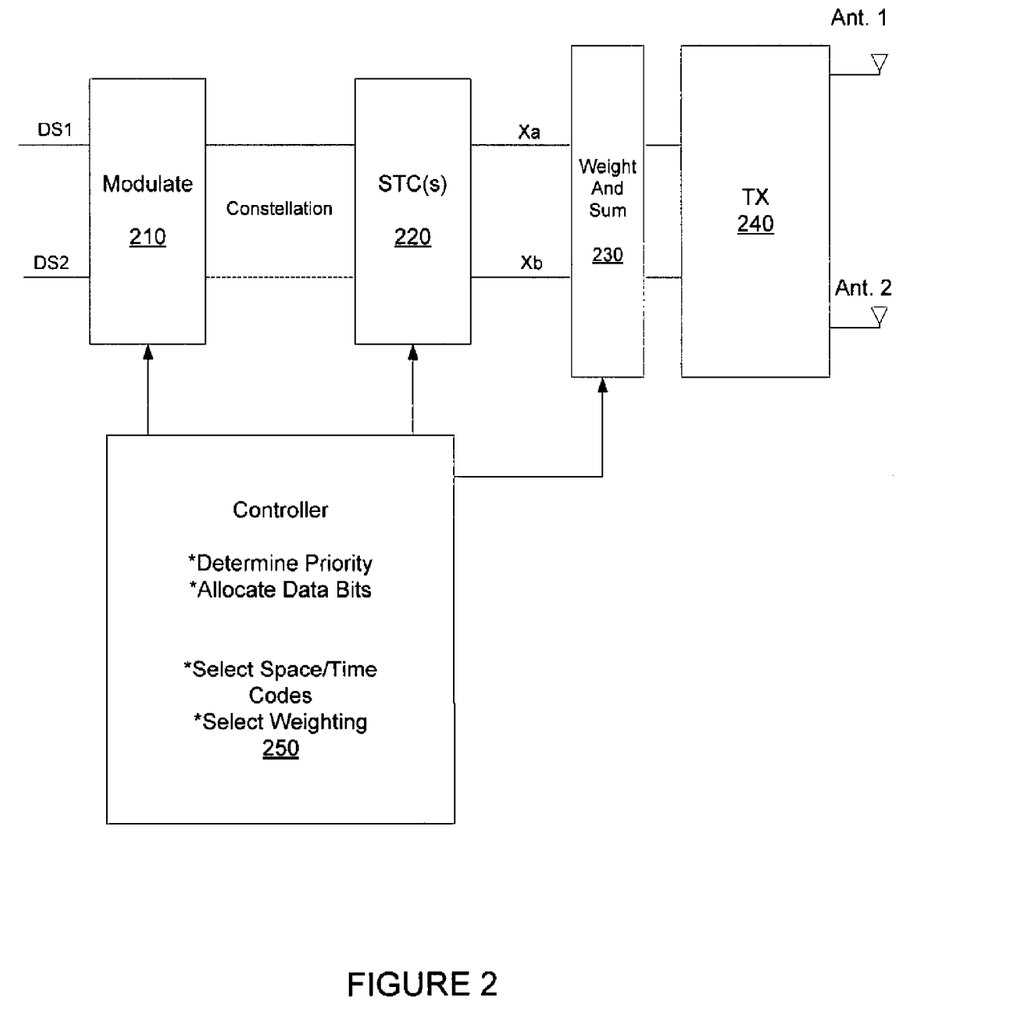
FIG. 2 shows an example of a block diagram of a transmitter and system control in which embodiments of multi-stream priority-based space-time coding are operable.

FIG. 2 shows an example of a block diagram of a transmitter in which embodiments of multi-stream space-time coding are operable. Multiple data streams (DS1, DS2) are received by a modulator and modulated into a constellation. As will be described, an embodiment includes the modulation being a hierarchical modulation in which one data stream has higher "priority" than the other, and is modulated accordingly. Additionally, a number of data bits can be allocated to each of the data streams. The priority can be determined by a controller 250.

The constellation is then space-time coded (STCs block 220) and linearly combined by summing and weighting (block 230) the space-time coded and modulated data streams. The space-time coded modulated signals are transmitted (through transmitter 240) through, for example, multiple antennas (Ant. 1, Ant. 2).

The embodiment in FIG. 2 only shows two data streams (DS1, DS2). However, it is to be understood that there can be any number of data streams which are prioritized and modulated/coded accordingly. The embodiment of FIG. 2 only shows two space time codes ($X_a$, $X_b$). However, it is to be understood that any number of space-time codes can be used in the modulating/coding of the priority-based data streams. FIG. 2 shows two transmission antennas (Ant. 1, Ant. 2). However, it is to be understood that any number of transmission antennas can be used. As will be described, the space-time codes can be vectors or matrices, and an embodiment includes the number of transmission antennas influencing the dimensions of the space-time code vectors or matrices. The dimensions of the space-time codes can also be influenced by a number of units of time.

Figure 3:
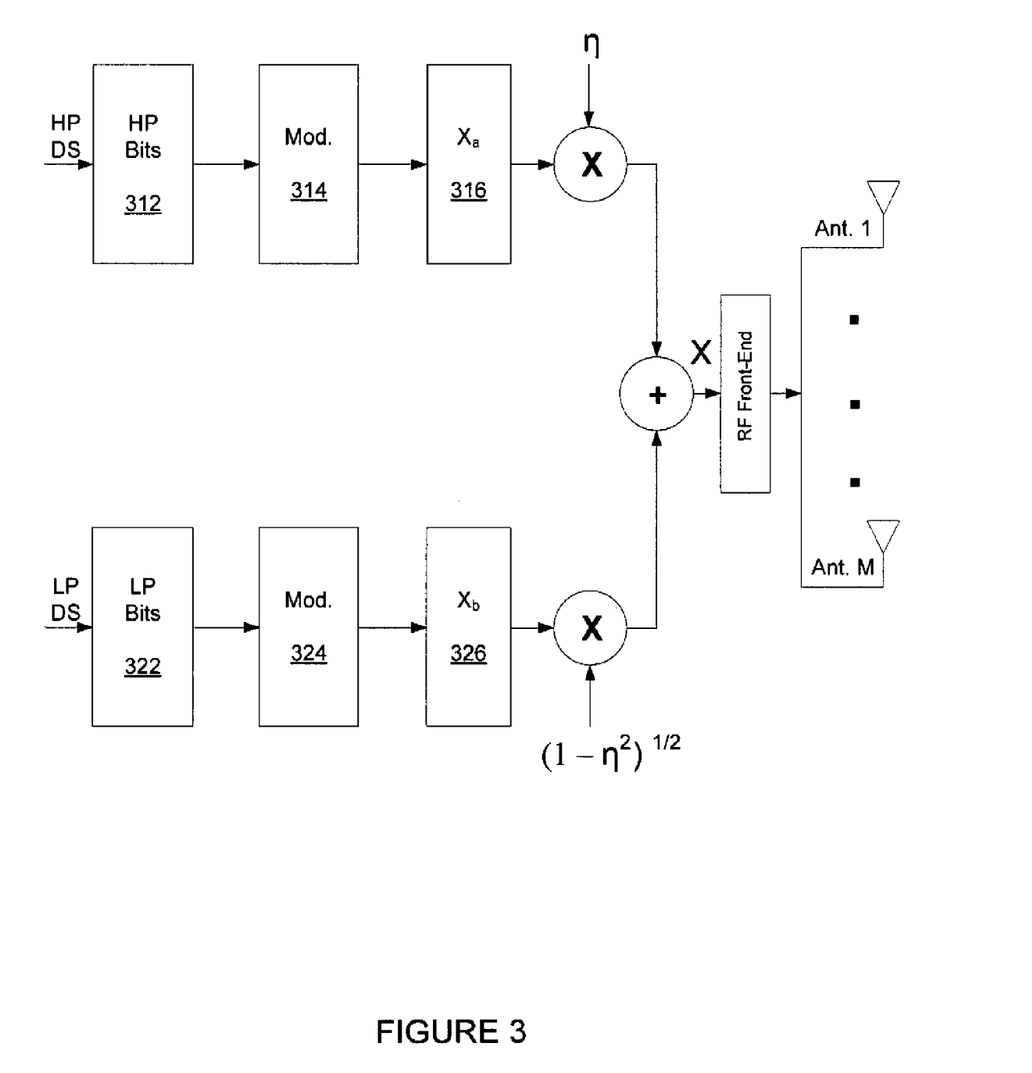
FIG. 3 shows another example of a block diagram of a transmitter in which embodiments of multi-stream priority-based space-time coding are operable.

FIG. 3 shows another example of a block diagram of a transmitter in which embodiments of multi-stream priority-based space-time coding are operable. Multiple data streams include, for example, a high priority (HP) data stream (DS) and a low priority (LP) data stream (DS). HP bits 312 are modulated 314. Simultaneously, LP bits 322 are modulated 324. The modulation of the HP bit stream varies from the modulation of the LP bit stream based at least in part on the priority of the bit streams, and the desired signal quality of the transmitted priority-based signals. That is, the desired signal quality of the transmitted signal at a receiver can influence the modulation of the data streams. For some embodiments, the HP data stream can be properly received when the received signal has a low signal quality, whereas the LP data stream cannot be properly received.

The modulators 314, 324 output symbols which are then space-time coded 316, 326 using space-time codes ($X_a$, $X_b$). As noted, only two space-time codes are shown because only two data streams are shown. Clearly, additional space-time codes can be used. Embodiments include the space-time codes being the same. Other embodiments include the space-time codes being different.

The outputs of the space-time code blocks 316, 326 are streams of vectors or matrices depending upon the dimensions of the space-time codes. The stream of matrices (or vectors) are weighted by the exemplary weightings $\eta$, $\sqrt{(1-\eta^2)}$, and then summed (this includes subtraction as well), resulting in a stream of matrices (or vectors) X. For an embodiment, the dimensions of the matrices X are M×T, where M is the number of transmit antennas (Ant. 1, Ant. M) and T represents a number of units of time. The stream of matrices are frequency up-converted for transmission through the transmit antennas by an RF front-end.

Figure 4:
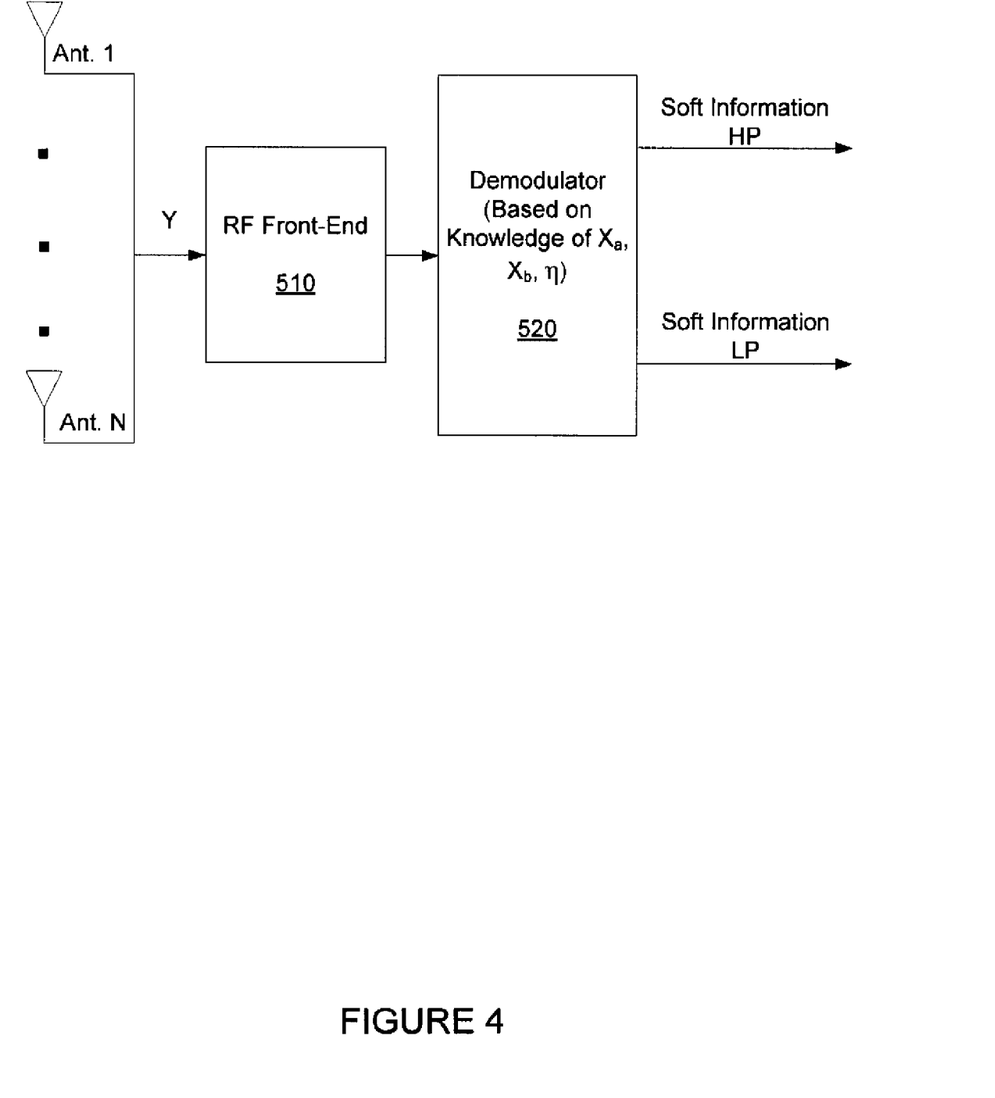
FIG. 4 shows an example of a block diagram of a receiver in which embodiments of multi-stream priority-based space-time coding are operable.

FIG. 4 shows an example of a block diagram of a receiver in which embodiments of multi-stream priority-based space-time coding are operable. The received signal can be received through any number of antennas (Ant. 1 through Ant. N). The received signal is converted to base-band through an RF front-end 510. The base band signal is then demodulated based on knowledge of the space-time coding of the transmitter, such as, $X_a$, $X_b$, $\eta$, $\sqrt{(1-\eta^2)}$. The demodulator generates at least one soft information bit stream. The soft information includes bits and reliability information associated with the bits.

As shown, a HP soft information bit stream is deduced, and a LP soft information bit stream is deduced. Two soft information bit streams are shown, but clearly any number of soft information bit streams can be deduced based at least in part on the number of priority-base streams that are associated with the transmitter. Embodiments include the receiver either determining how many soft information bit streams are to be deduced (for example, based on received signal quality or based on the processing capability of the receiver), or the receiver being instructed how many soft information bit streams are to be deduced (for example, based on a subscription).

Based on the space-time coding and weighting of the transmitter, the receiver can deduce the priority-based soft information bit streams. Embodiments include determining which of the soft information bit streams are deduced. The determination can be based on the signal quality of the received signal. HP bit streams can withstand lower receive signal quality than LP bit streams. That is, as reflected in the priority, the HP bit stream can be designed to be more robust. It should be noted, however, that the space-time coding and weighting of the LP bit streams is needed for the decoding of the HP bit stream.

Other embodiments include the receiver selecting which priority-based soft information bit streams to deduce. For example, the receiver may choose to only receive a subset of the total number of soft information priority-based bit streams.

Other embodiments include only allowing the receiver to generate a subset of the priority-based information bit streams. For example, the receiver may be subject to a subscription that only allows for deduction of a select subset of the available soft information priority-based bit streams. The transmitted priority-based signal can be broadcast. Only subscribers (receivers) having permission, may be able to properly decode certain priority-based data streams.

Figure 5:
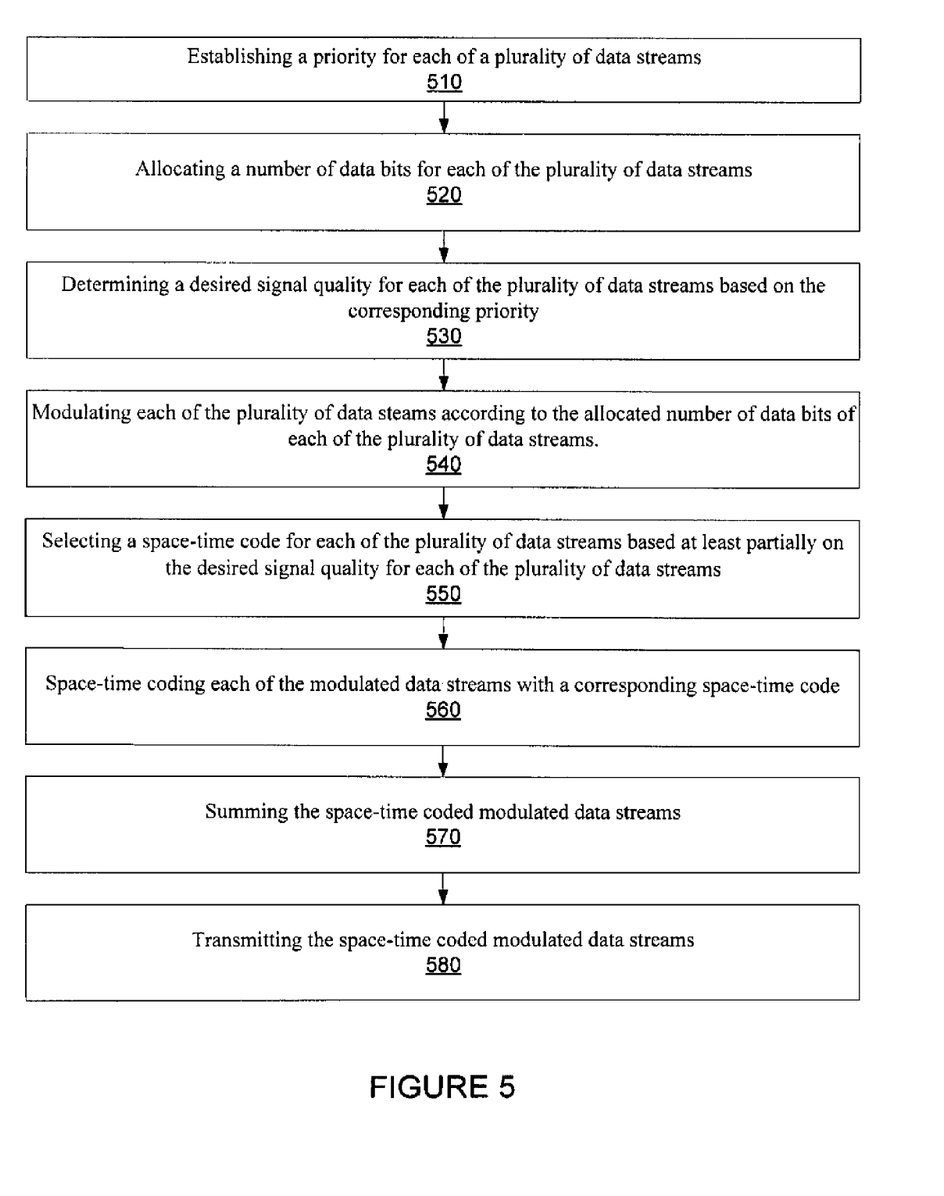
FIG. 5 is a flow chart that includes steps of an example of a method of priority-based space-time coding.

FIG. 5 is a flow chart that includes steps of an example of a method of multi-stream space-time coding. A first step 510 includes establishing a priority for each of a plurality of data streams. A second step 520 includes allocating a number of data bits for each of the plurality of data streams. A third step 530 includes determining a desired signal quality for each of the plurality of data streams based on the corresponding priority. The desired signal quality can be, for example, at a receiver (subscriber station). The desired signal quality can be either an absolute value, or relative values between streams. A fourth step 540 includes modulating each of the plurality of data steams according to the allocated number of data bits of each of the plurality of data streams. A fifth step 550 includes selecting a space-time code for each of the plurality of data streams based at least partially on the desired signal quality for each of the plurality of data streams. For an embodiment, the space-time codes are a vector or a matrix. A sixth step 560 includes space-time coding each of the modulated data streams with the selected space-time code. Other embodiments include weighting and linearly combining the space-time coded data streams, whereby both the selected space-time codes and the weighting of the streams jointly determine the space-time coding of the plurality of data streams. A seventh step 570 includes summing the space-time coded modulated data streams. An eighth step 580 includes transmitting the space-time coded modulated data streams.

Figure 6:
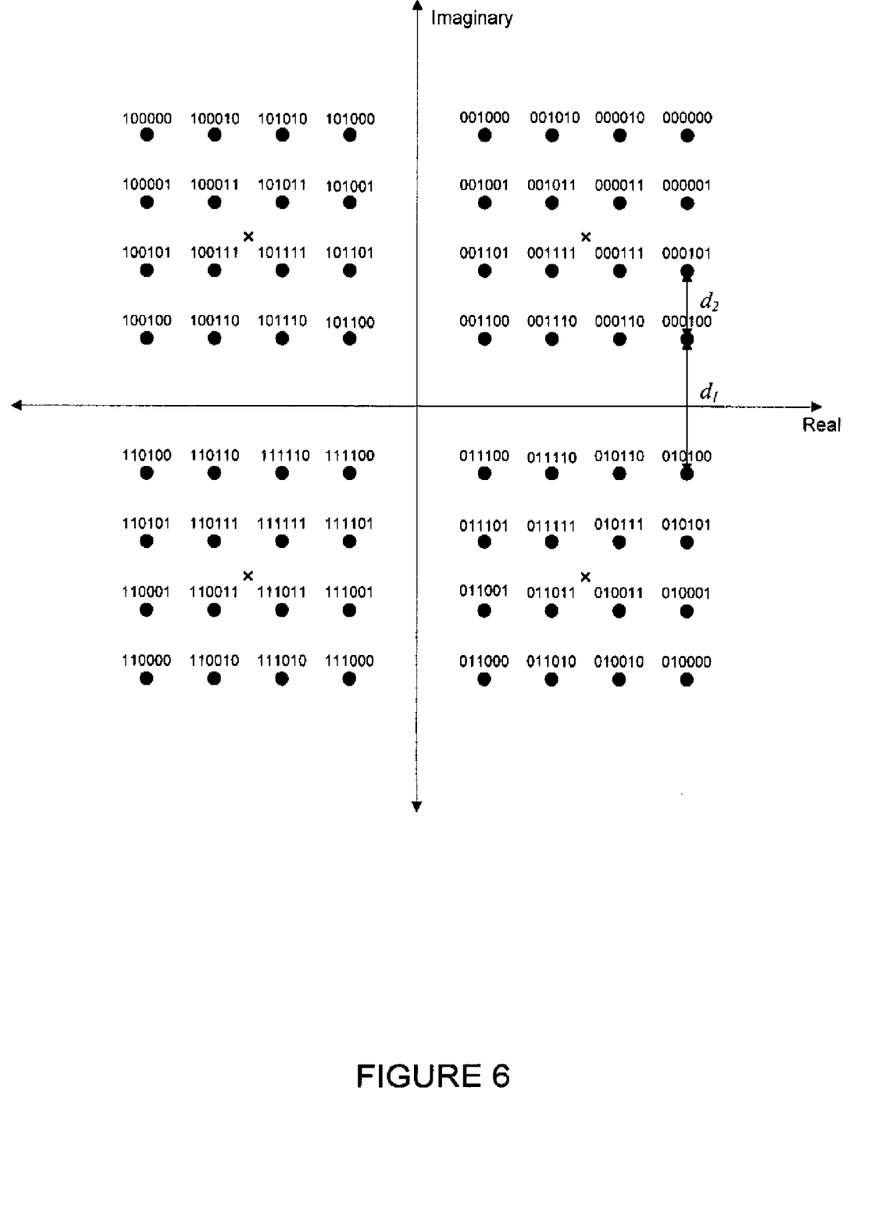
FIG. 6 shows an example of a constellation of hierarchical modulated signals.

As described, each of the plurality of data streams are modulated according to the allocated number of data bits of each of the plurality of data streams. One method of doing this includes hierarchical modulation of the data streams. FIG. 6 shows an example of a constellation of hierarchical modulation signals. Hierarchical modulation is used in several communication standards as it allows both high and low-priority streams and is simple to decode. Hierarchical modulation is based on transmitting two streams, one of which has higher "priority" than the other. The priority can be established by the relative constellation spacing as determined by a parameter α. FIG. 6 provides an example which can be referred to as "QPSK in 64-QAM" in which the high-priority stream carries two bits and the low-priority stream carries four bits. The high-priority QPSK is marked on in FIG. 6 as the four points at the centers of the four separate 16-QAM constellations that together form the 64-QAM constellation. These four points are assigned two bits according to a Gray mapping and usually carry important data that even terminals with low SINR should be able to decode. There is often some form of outer protection on these bits, in the form of a convolutional or turbo code. The act of determining the two bits in the high-priority stream is the same as determining from which of the four quadrants the transmitted signal was chosen.

The total information carried by this constellation is six bits, the first two of which are the "high-priority" QPSK stream, and the remaining four are the "low-priority" 16-QAM stream. The high-priority stream determines the quadrant of the transmitted signal and the low-priority stream determines the 16-QAM point within the quadrant. In FIG. 6, a strong preference is given to the QPSK stream. This stream is indicated figuratively by the "x"es, representing the centers of the 16-QAM constellations in their respective quadrants.

While the high-priority stream determines the quadrant, the low-priority stream determines the point within the quadrant. The low-priority stream usually carries data that is less important than, or a refinement of, the high-priority stream. As with the high-priority stream, the low-priority stream also has some form of outer code protection; this code is separate from the high-priority code. The low-priority stream is also Gray coded, but unlike the high-priority stream, the bit labeling depends on the quadrant. This insures that adjacent low-priority stream constellation points have a small number of bits different. These two streams can be referred to as jointly-Gray coded when coded in this way, as each point of the transmitted signal derived from the high and low-priority streams has nearest neighbors which differ by one bit.

The division of available power between the high and low-priority schemes is determined by $$\alpha = d_1/d_2$$

where $d_2$ is the minimum distance within the 16-QAM constellation and $d_1$ is the minimum distance between neighboring 16-QAM constellations, as illustrated in FIG. 6.

DVB-T, for example, allows for three choices of α. The choice α=1 results in a standard 64-QAM constellation, and the choices α=2, 4 allow more power to be allocated to the QPSK constellation. The SINR needed to decode the high-priority stream is lower than the low-priority stream.

Another form of hierarchical modulation used in DVB-T is QPSK in 16-QAM. In this case, the high and low-priority streams are both QPSK. The definition of α still applies, except that $d_2$ is now the minimum distance within the low-priority QPSK constellation. α=1 results in a standard 16-QAM constellation. The weighting (power sharing) parameter η can be defined that determines the power split between the two streams. Therefore, $\eta^2$ determines the fraction of total power dedicated to the high-priority stream, with $\eta \in [0,1]$, and $1-\eta^2$ determines the fraction of power dedicated to the low-priority stream. The ratio of minimum distances a can be converted to an equivalent η. For QPSK-in-64-QAM, $$\eta = \sqrt{1 - \frac{5}{((\alpha+3)^2 + 5)}},$$

and $$\alpha = \sqrt{\frac{5}{1-\eta^2} - 5} - 3.$$

For QPSK-in-16-QAM, $$\eta = \sqrt{1 - \frac{1}{((\alpha+1)^2 + 1)}},$$

and $$\alpha = \sqrt{\frac{5}{1-\eta^2} - 1} - 1.$$

The transmitted symbol of the hierarchical modulation can be constructed as $x = \eta s_a + \sqrt{1-\eta^2} s_b$, where $s_a$ is the high-priority QAM and $s_b$ is the low-priority QAM. Subsequent descriptions use η rather than α.

Multi-Stream Space-Time Model

The concepts of hierarchical modulation of multiple streams and space-time coding can be combined. The high-priority stream can be assigned an M×T space-time code matrix $X_a$ including the elements $$s_a = s_{a,1}, \ldots, s_{a,A},$$

and the low-priority stream is given its own code $X_b$, that includes the symbols $$s_b = s_{b,1}, \ldots, s_{b,B},$$

where A+B is the total number of symbols. The space-time codes $X_a$ and $X_b$ are then formed using $s_a$ and $s_b$, respectively.

For example, Xa can be constructed from $s_a$ via the Alamouti space-time code as follows $$X_a = \begin{bmatrix} s_{a,1} & -s_{a,2}^* \\ s_{a,2} & s_{a,1}^* \end{bmatrix}.$$

Then the two-stream version of X follows as:

$$X = \eta X_a + \sqrt{(1-\eta^2)} X_b$$

and the allowed power parameter $\eta \in [0,1]$ represents a power-weighting between the high and low-priority streams. Typically, $\eta > 1/\sqrt{2}$, reflecting that the high-priority stream is generally transmitted with a higher power than the low-priority stream.

An Exemplary Two-Stream Design Criteria

In order to design new multi-stream space-time codes, code performance can be analyzed using the minimum determinant and then considering how the choice of code affects the receiver structure and decoding complexity. The role of bit assignments of the constellation points can be considered and how it relates to code performance and receiver structure. For this example, define $a=(a_0, \ldots, a_{ra*T-1})$ to be the high-priority bit stream and $b=(b_0, \ldots, b_{rb*T-1})$ to be the low-priority stream. The parameters ra and rb are the data rates of the high and low-priority streams, respectively, in bits per units of time. An optimization is:

$$\delta(\{X\}, d) \equiv \max_{\substack{\{X\} \\ |\{X\}|=C}} \max_{0 \leq \eta \leq 1} \min_{\substack{a \neq a' \\ \forall b, b'}} \det(X - X')(X - X')^*$$

Subject to:

$$\min_{\substack{b \neq b' \\ \forall a, a'}} \det(X - X')(X - X')^* \geq d, \text{ for some } d \geq 0.$$

For the above-optimization, $\{X\}$ is the set of the entire codebook, and C is the size of $\{X\}$. Additionally, X' is derived from a' and b' in a similar fashion as X is derived from a and b, wherein a' and b' are distinct from a and b. The variable a' may take on the same value as a, and similarly for b and b'.

The exemplary determinant optimization seeks to maximize the high-priority stream performance for a given level of low-priority stream performance. The minimum level of low-priority stream performance is given by the parameter d. This optimization is based on the determinate criterion of space time coding, which equates high-SNR performance with the minimum determinant of a codeword difference matrix product. Maximizing the minimum determinant improves the high-SNR performance of the code, as the larger the distance between two codewords, as indicated by the determinate, the easier they are to differentiate making an error less likely. In the multi-stream case, though, the determinate criterion can be extended by differentiating between codeword errors on the high and low-priority streams. Thus, the performance of the high-priority stream for a given level of low-priority stream performance can be optimized.

Other Embodiments of Multi-Stream Space-Time Coding

As mentioned, an embodiment includes the space-time codes being weighted before being combined. That is, summing the space-time coded modulated data streams includes weighting and summing the space-time coded modulated data streams, wherein the weighting of each space-time coded modulated stream is based at least in part on the desired signal quality corresponding with each data stream. An embodiment includes the weighting of at least one modulated data stream being different than at least one other modulated data stream.

Different methods can be used for determining the desired signal quality. For an embodiment, determining the desired signal quality for the expected modulated data streams of each of the plurality of data streams based on the corresponding priority includes determining a desired relative signal to noise ratio (SNR) difference between at least two of the plurality of data streams. For another embodiment, determining the desired signal quality for the expected modulated data streams of each of the plurality of data streams based on the corresponding priority includes determining an absolute signal to noise ratio (SNR) required by at least one of the plurality of data streams.

As previously stated, space-time codes (STC) can be used to improve the reliability of data transmission in multiple antenna communication systems. An embodiment includes transmitting the space-time coded modulated data streams over at least one of multiple transmit antennas or multiple units of time. A size of the vector or matrix (of the space-time codes) can be dependent upon a number of transmitter antennas of a transceiver (or transmitter) utilizing the method of space-time coding.

Direct-Sum of Space-Time Code and Hierarchical Modulation

Another embodiment includes the same space-time code being used for more than one data stream. More specifically, the same space-time code is used for all of the data streams. An embodiment for enabling different priority streams with space-time coding is to combine hierarchical modulation with an existing known space-time code. The combination of hierarchical modulation and a space-time code can be referred to as a "direct-sum". The direct-sum uses the same space-time code for both high and low-priority streams.

An embodiment includes the space-time code for at least one of the data streams being different than the space-time code of at least one other data stream. That is, this embodiment can include $X_a \neq X_b$.

Unitary-Transform Codes

Exemplary unitary-transform codes can be determined that outperform the direct-sum codes previously described. While allowing the space-time code for the high-priority stream, $X_a$, and the low-priority stream, $X_b$, to be different is most general, a more specific embodiment includes the case when $X_a$ and $X_b$ are distinct, but related via a unitary transform. This particular relationship between $X_a$ and $X_b$ is considered because of advantageous receiver implementation complexity. The unitary transform derives $X_b$ from $X_a$ via the following:

$$GX_a D \rightarrow X_b$$

where G is a unitary matrix and D is a diagonal unitary matrix. The space-time code $X_b$ for stream b is derived from the space-time code $X_a$ selected for stream a, by multiplying $X_a$ by G and D and relating the input a as input b. The mapping indicates that $X_b$ is constructed by transforming $X_a$. The G and D matrices are used to optimize performance.

Various methods can be used for selecting the space-time codes for the different data streams. A first space-time code can be selected, and a second space-time code can be determined based on the first space-time code. For example, the first space-time code can be selected to be an Alamouti space-time code; and the second space-time code can be selected based at least in part on the selected first space-time code. For a specific embodiment, the second space-time code is a unitary transform of the first space-time code. As will be described in detail, for a more specific exemplary embodiment, a transceiver utilizing the method of space-time coding includes two transmit antennas, and selecting the second space-time code based at least in part on the selected first space-time code includes deriving the second space-time code based on the first space time code, a G matrix and a D matrix.

The choice G and D matrices can be further constrained based on a mutual information consideration. When $X_a$ is chosen to be the Alamouti matrix and $\eta=1/\sqrt{2}$, choosing G and D of the following form insures that the code design does not reduce the capacity of the effective channel, where the effective channel is the combination of the channel H and the space-time code. Maximizing the capacity of the effective channel improves performance. The following are exemplary G and D matrices:

$$G = \begin{bmatrix} g_1 & -g_2^* \\ g_2 & g_1^* \end{bmatrix}, \text{ and}$$

$$D = \begin{bmatrix} e^{i(\frac{\pi}{2}+\theta)} & 0 \\ 0 & e^{i(\frac{\pi}{2}-\theta)} \end{bmatrix},$$

where $i=\sqrt{-1}$, $-\pi \leq \theta \leq \pi$, and $g_1$, $g_2$ are complex numbers such that $|g_1|^2+|g_2|^2=1$.

Figure 7:
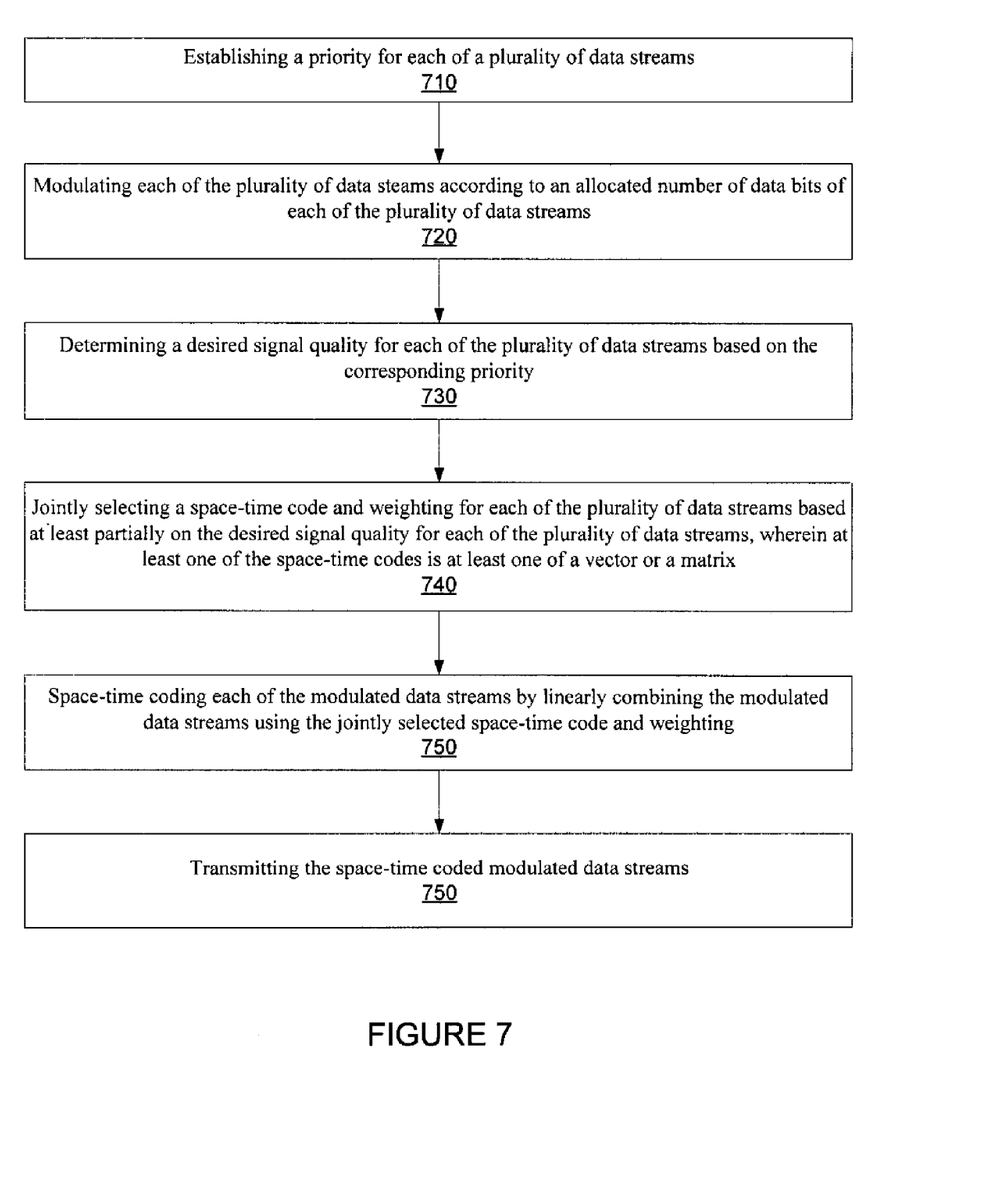
FIG. 7 is a flow chart that includes steps of another example of a method of priority-based space-time coding.

FIG. 7 is a flow chart that includes steps of another example of a method of priority-based space-time coding. A first step 710 includes establishing a priority for each of a plurality of data streams. A second step 720 includes modulating each of the plurality of data steams according to an allocated number of data bits of each of the plurality of data streams. A third step 730 includes determining a desired signal quality for each of the plurality of data streams based on the corresponding priority. A fourth step 740 includes jointly selecting a space-time code and weighting for each of the plurality of data streams based at least partially on the desired signal quality for each of the plurality of data streams, wherein at least one of the space-time codes is at least one of a vector or a matrix. A fifth step 750 includes space-time coding each of the modulated data streams by linearly combining the modulated data streams using the jointly selected space-time code and weighting. A sixth step 760 includes transmitting the space-time coded modulated data streams. An embodiment further includes a plurality of base stations of a wireless broadcast system, wherein each base station broadcasts (transmits) a plurality of space-time coded signals, wherein the broadcasting (transmitting) includes the steps 710, 720, 730, 740, 750, 760. Subscribers (receivers) can receive the broadcast signals and selectively decode the priority-based data streams. The selection can be dictated by receive signal quality, by subscription, or as selected by the receiver based on processing capability of the receiver.

Figure 8:
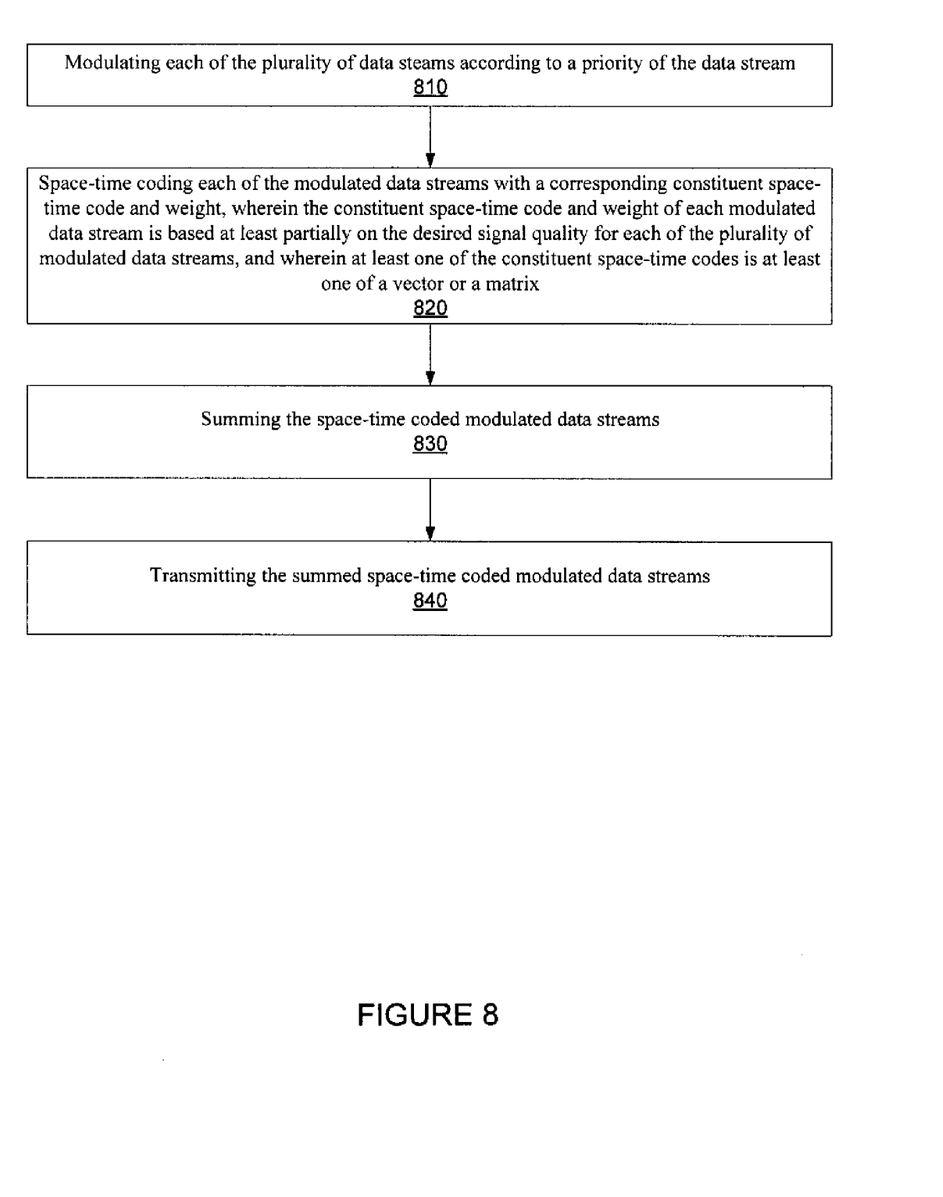
FIG. 8 is a flow chart that includes steps of an example of a method of transmitting a plurality of space-time coded signals.

FIG. 8 is a flow chart that includes steps of an example of a method of transmitting a plurality of space-time coded signals. A first step 810 includes modulating each of the plurality of data steams according to a priority of the data stream. A second step 820 includes space-time coding each of the modulated data streams with a corresponding constituent space-time code and weight, wherein the constituent space-time code and weight of each modulated data stream is based at least partially on the desired signal quality for each of the plurality of modulated data streams, and wherein at least one of the constituent space-time codes is at least one of a vector or a matrix. A third step 830 includes summing the space-time coded modulated data streams. A fourth step 840 includes transmitting the summed space-time coded modulated data streams.

As previously described, embodiments include the space-time code for at least one of the data streams being different than the space-time code of at least one other data stream. As previously described, embodiments include a same space-time code is used for more than one data stream. As previously described, for an embodiment, selecting the space-time code for each of the plurality of data streams includes selecting a first space-time code, and then selecting a second space-time code based at least in part on the selected first space-time code.

Figure 9:
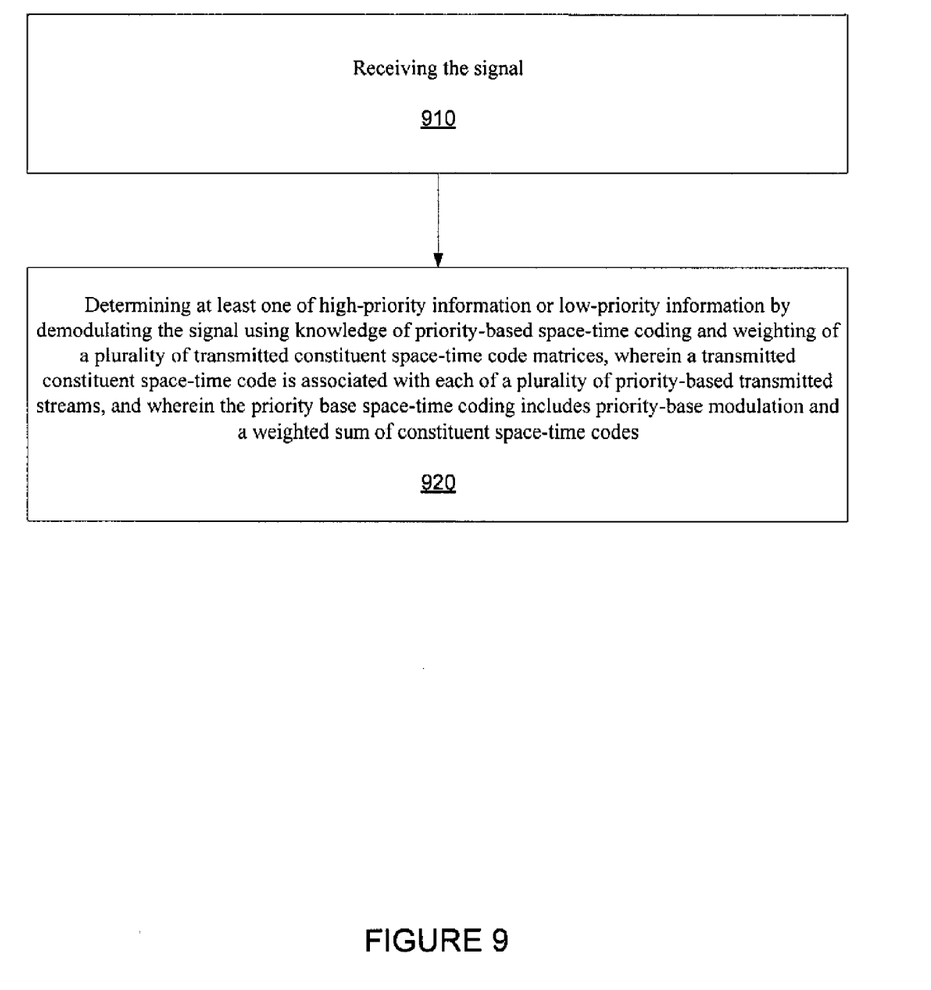
FIG. 9 is a flow chart that includes steps of an example of a method of receiving a signal, wherein the signal was transmitted using priority-based space-time coding.

FIG. 9 is a flow chart that includes steps of an example of a method of receiving a signal, wherein the signal was transmitted using priority-based space-time coding. A first step 910 includes receiving the signal (through one or more antennas). A second step 920 includes determining at least one of high-priority information or low-priority information by demodulating the signal using knowledge of priority-based space-time coding and weighting of a plurality of transmitted constituent space-time code matrices, wherein a transmitted constituent space-time code is associated with each of a plurality of priority-based transmitted streams, and wherein the priority base space-time coding includes priority-base modulation and a weighted sum of constituent space-time codes.

An embodiment further includes using knowledge of a number of bits per channel used for each of the priority-base data streams for demodulation of the signal. An embodiment further includes deducing a high-priority bit stream and low-priority bit stream based on the high-priority information and the low-priority information.

An embodiment includes determining only a subset of the at least one of a high-priority information or low-priority information based on a level of signal quality of the received signal. Another embodiment includes determining only a subset of the at least one of a high-priority information or low-priority information based on an external factor.

Implementations and Performance Results

The following table shows exemplary selections of direct-sum space-time coding and unitary-transform coding of multiple data streams. The table first includes a pair of direct-sequence Alamouti (DS-A) space-time codes and weights. The table additionally includes a second pair of unitary-transform Alamouti (UT-A) codes, weights, and D and G matrices. For DS-A, both $X_a$ and $X_b$ are chosen to be an Alamouti space-time code. For UT-A, $X_a$ is chosen to be an Alamouti space-time code and $X_b$ is derived from the unitary transform $GX_aD \rightarrow X_b$, where G and D are given in the following table.

|  | High Priority | Low Priority | η | δ({X}) | D | G |
|---|---|---|---|---|---|---|
| DS-A | QPSK | QPSK | $\sqrt{4/5}$ | 0.040 | — | — |
| DS-A | QPSK | 16-QAM | $\sqrt{16/21}$ | 0.0023 | — | — |
| UT-A | QPSK | QPSK | 0.85 | 0.052 | i × I | $\begin{bmatrix} 0.40 & -0.90 + 0.17i \\ 0.90 + 0.17i & 0.40 \end{bmatrix}$ |
| UT-A | QPSK | 16-QAM | 0.86 | 0.0041 | i × I | $\begin{bmatrix} 0.60 & -0.20 + 0.80i \\ 0.20 + 0.80i & 0.60 \end{bmatrix}$ |

Figure 10:
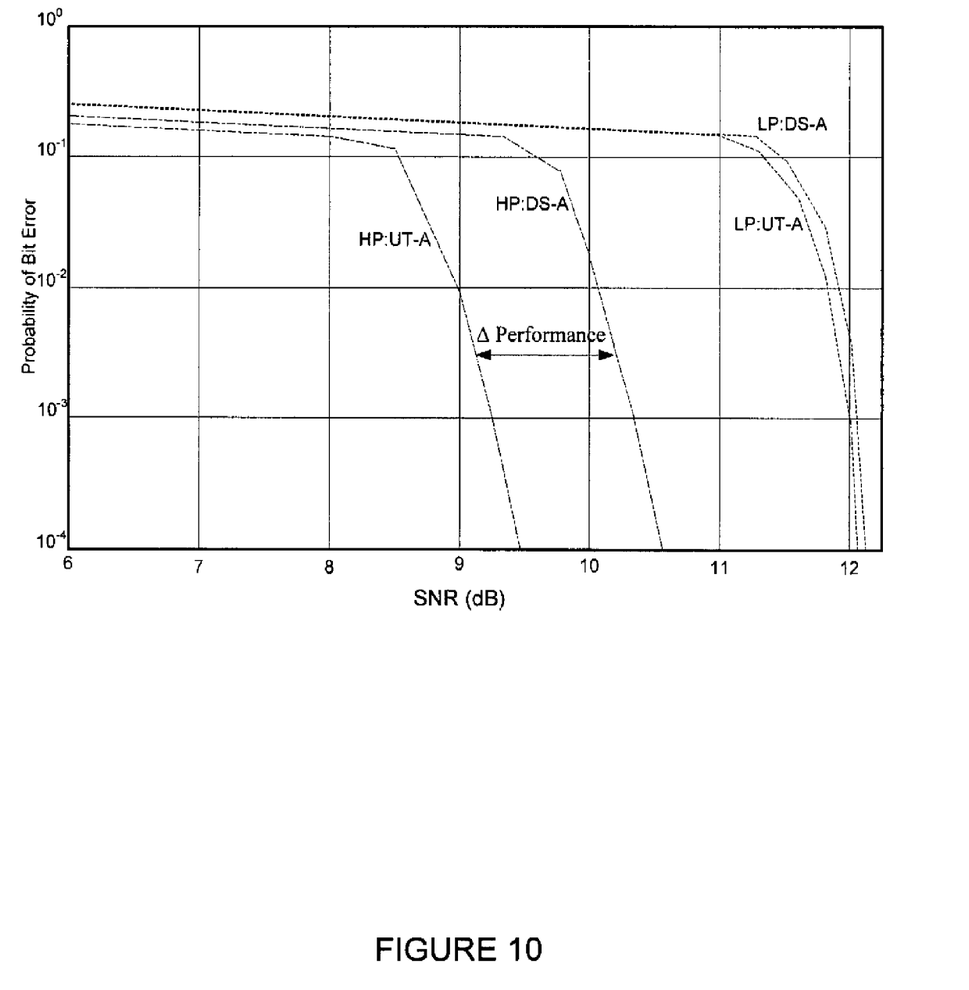
FIG. 10 shows an example of performance measurements of low and high priority data streams for two different space-time code selections.

FIG. 10 shows performance results of DS-A and UT-A with QPSK and QPSK used on high-priority and low-priority, respectively, per the table above. As shown, the LP (low-priority) data streams of the UT-A and DS-A data streams provide near-equivalent performance. However, the HP (high-priority) data streams of the UT-A and DS-A data streams are different as indicated by the Δ performance indicator. For probability of bit errors less than $10^{-1}$, the HP:UT-A data stream requires an SNR that is about 1 dB less than the SNR required by the HP:DS-A data stream.

Figure 11:
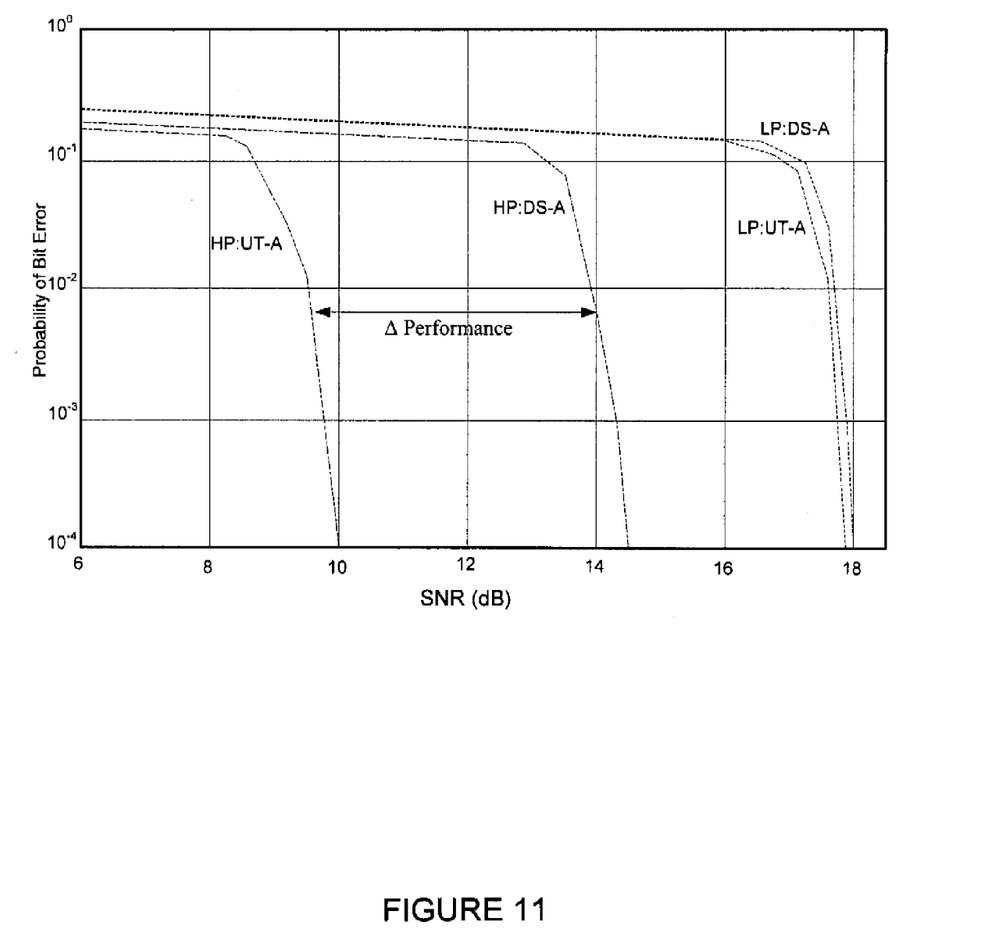
FIG. 11 shows an example of additional performance measurements of low and high priority data streams for two different space-time code selections.

FIG. 11 shows performance results of DS-A and UT-A with QPSK and 16QAM used on high-priority and low-priority, respectively, per the table above. As shown, the LP (low-priority) data streams of the UT-A and DS-A data streams provide near-equivalent performance. However, the HP (high-priority) data streams of the UT-A and DS-A data streams are different as indicated by the Δ performance indicator. For probability of bit errors less than $10^{-1}$, the HP:UT-A data stream requires an SNR that is more than 4 dB less than the SNR required by the HP:DS-A data stream.

Although specific embodiments have been described and illustrated, the embodiments are not to be limited to the specific forms or arrangements of parts so described and illustrated.

What is claimed:

1. A method of space-time coding, comprising:
   establishing a priority for each of a plurality of data streams;
   allocating a number of data bits for each of the plurality of data streams;
   determining a desired signal quality for each of the plurality of data streams based on the corresponding priority;
   modulating each of the plurality of data steams according to the allocated number of data bits of each of the plurality of data streams;
   selecting a space-time code for each of the plurality of data streams based at least partially on the desired signal quality for each of the plurality of data streams, wherein at least one of the space-time codes is at least one of a vector or a matrix;
   space-time coding each of the modulated data streams with the selected space-time code;
   summing the space-time coded modulated data streams; and
   transmitting the space-time coded modulated data streams.

2. The method of claim 1, wherein summing the space-time coded modulated data streams comprises weighting and summing the space-time coded modulated data streams, wherein the weighting of each space-time coded modulated stream is based at least in part on the desired signal quality corresponding with each data stream.

3. The method of claim 2, wherein weighting of at least one modulated data stream is different than at least one other modulated data stream.

4. The method of claim 1, wherein a same space-time code is used for more than one data stream.

5. The method of claim 1, further comprising transmitting the space-time coded modulated data streams over at least one of multiple transmit antennas or multiple units of time.

6. The method of claim 1, wherein a size of the vector or matrix is dependent upon a number of transmitter antennas of a transceiver utilizing the method of space-time coding.

7. The method of claim 1, wherein the space-time code for at least one of the data streams is different than the space-time code of at least one other data stream.

8. The method of claim 1, wherein selecting the space-time code for each of the plurality of data streams comprises:
   selecting a first space-time code to be an Alamouti space-time code; and
   selecting a second space-time code based at least in part on the selected first space-time code.

9. The method of claim 8, wherein the second space-time code is a unitary transform of the first space-time code.

10. The method of claim 9, wherein a transceiver utilizing the method of space-time coding comprises two transmit antennas, and wherein selecting the second space-time code based at least in part on the selected first space-time code comprises: deriving the second space-time code based on the first space time code, a G matrix and a D matrix, wherein $$G = \begin{bmatrix} g_1 & -g_2^* \\ g_2 & g_1^* \end{bmatrix}, \text{ and}$$

$$D = \begin{bmatrix} e^{i(\frac{\pi}{2}+\theta)} & 0 \\ 0 & e^{i(\frac{\pi}{2}-\theta)} \end{bmatrix}.$$

11. The method of claim 1, wherein determining the desired signal quality for the expected modulated data streams of each of the plurality of data streams based on the corresponding priority comprises determining a desired relative signal to noise ratio (SNR) difference between at least two of the plurality of data streams.

12. The method of claim 1, wherein determining the desired signal quality for the expected modulated data streams of each of the plurality of data streams based on the corresponding priority comprises determining an absolute signal to noise ratio (SNR) required by at least one of the plurality of data streams.

13. A method of space-time coding, comprising:
   establishing a priority for each of a plurality of data streams;

modulating each of the plurality of data steams according to an allocated number of data bits of each of the plurality of data streams;

determining a desired signal quality for each of the plurality of data streams based on the corresponding priority;

jointly selecting a space-time code and weighting for each of the plurality of data streams based at least partially on the desired signal quality for each of the plurality of data streams, wherein at least one of the space-time codes is at least one of a vector or a matrix;

space-time coding each of the modulated data streams by linearly combining the modulated data streams using the jointly selected space-time code and weighting; and transmitting the space-time coded modulated data streams.

14. The method of claim 13, further comprising a plurality of base stations of a wireless broadcast system, wherein each base station broadcasts a plurality of space-time coded signal.

15. A method of transmitting a plurality of space-time coded signals, comprising:

modulating each of the plurality of data steams according to a priority of the data stream;

space-time coding each of the modulated data streams with a corresponding constituent space-time code and weight, wherein the space-time code and weight of each modulated data stream is based at least partially on a desired signal quality for each of the plurality of modulated data streams, and wherein at least one of the constituent space-time codes is at least one of a vector or a matrix;

summing the space-time coded modulated data streams; and transmitting the summed space-time coded modulated data streams.

16. The method of claim 15, wherein the constituent space-time code for at least one of the data streams is different than the space-time code of at least one other data stream.

17. The method of claim 15, wherein a same constituent space-time code is used for more than one data stream.

18. A method of receiving a signal, comprising:

receiving the signal;

determining at least one of high-priority information or low-priority information by demodulating the signal using knowledge of priority-based space-time coding and weighting of a plurality of transmitted constituent space-time code matrices, wherein a transmitted constituent space-time code is associated with each of a plurality of priority-based transmitted streams, and wherein the priority base space-time coding includes priority-base modulation and a weighted sum of constituent space-time codes.

19. The method of claim 18, further comprising additionally using knowledge of a number of bits per channel used for each of the priority-base data streams for demodulation the signal.

20. The method of claim 18, further comprising deducing a high-priority bit stream and low-priority bit stream based on the high-priority information and the low-priority information.

21. The method of claim 18, further comprising determining only a subset of the at least one of a high-priority information or low-priority information based on a level of signal quality of the received signal.

22. The method of claim 18, further comprising determining only a subset of the at least one of a high-priority information or low-priority information based on an external factor.

23. The method of claim 18, wherein the signal is received through multiple antennas.

* * * * *